United States Patent [19]

Suzuki

[11] 3,904,149

[45] Sept. 9, 1975

[54] CASSETTE LOADING APPARATUS FOR USE IN CASSETTE TAPE RECORDER

[75] Inventor: Shoji Suzuki, Iwaki, Japan

[73] Assignee: Alps Motorola Inc., Tokyo, Japan

[22] Filed: Aug. 23, 1974

[21] Appl. No.: 500,025

[30] Foreign Application Priority Data

Aug. 29, 1973 Japan ........................ 48-101393

[52] U.S. Cl. .................................. 242/198; 360/96

[51] Int. Cl.² .................... G11B 23/10; G11B 15/68

[58] Field of Search ........... 242/198, 199, 200, 180, 242/181; 360/93, 96

[56] References Cited

UNITED STATES PATENTS

| | | | |
|---|---|---|---|
| 3,395,871 | 8/1968 | Ackermann et al. | 242/198 |
| 3,638,953 | 2/1972 | Kodama et al. | 360/96 |
| 3,752,488 | 8/1973 | Righi | 360/93 |

*Primary Examiner*—George F. Mautz

*Attorney, Agent, or Firm*—James W. Gillman; Donald J. Lisa

[57] ABSTRACT

A cassette loading apparatus for use in a cassette tape device having a housing with an opening adapted to receive a cassette tape cartridge and having a cassette holding frame within the housing adapted to receive the tape cartridge. The holding frame is movable between a first position aligned with the opening when the cartridge is inserted into the device and a second position wherein the tape cartridge is held in the play position against the tape drive mechanism. A retention lever engageable with the holding frame when the frame is in the first position and disengageable from the holding frame when a cassette cartridge is inserted into the opening in the housing. A spring is engageable with the holding frame to bias the frame to a second or playing position when the retention lever is disengaged from the case. A control lever is engageable with a projection mounted to the holding frame to hold the frame in the second position when the control lever is in an outward position. The control lever is movable to an inward position to engage and to pivot a lever mounted in the housing. The pivotal movement of the lever causes the lever to engage the projection to thereby move the holding frame to the first position aligned with the opening in the housing to permit removal of the cassette cartridge from the holding frame.

8 Claims, 2 Drawing Figures

CASSETTE LOADING APPARATUS FOR USE IN CASSETTE TAPE RECORDER

BACKGROUND OF THE INVENTION

This invention relates to a cassette loading mechanism for use in a cassette tape recorder/reproducer device in which a cassette cartridge is inserted horizontally into a slot or opening in the cassette tape device housing. More particularly, this invention relates to a mechanism in which a cassette tape cartridge is held firmly in the play position against the tape drive mechanism by automatically positioning and holding a holding frame adapted to receive the cartridge in the play position.

In the past, cassette tape recording/reproducing devices having an opening in the housing adapted to receive a cassette tape cartridge have included only a spring to position and hold the cartridge receiving case and the cassette cartridge in playing position against the tape drive mechanism. However, such prior art devices have the disadvantage that the cassette tape cartridge is readily disengaged from the playing position when the tape device is vibrated, such as being driven over rough roads. Consequently, such prior art devices have not enjoyed acceptance where the possibility exists that the tape device will be subject to vibration.

SUMMARY OF THE INVENTION

It is an object of this invention to provide a cassette loading mechanism for a cartridge tape recorder/reproducer device wherein the cartridge holding frame is firmly positioned and held in the playing position against the tape drive mechanism.

It is another object of this invention to provide an improved and inexpensive cassette loading mechanism for a cassette tape recorder/reproducer device which automatically positions and holds the cassette tape cartridge in the play position.

In accordance with the present invention, a cassette loading mechanism for use in a cassette tape recorder/reproducer device having a housing with an opening adapted to receive a cassette tape cartridge and a tape drive mechanism engageable with the tape cartridge includes a cassette holding frame mounted within the housing. The holding frame is movable between a first position aligned with the opening and a second position wherein the holding frame and the attendant cassette tape cartridge is held in the play position against the tape drive mechanism. A retention lever is engageable with the holding frame when the holding frame is in the first position to hold and align the frame with the opening. The retention lever is disengaged from the holding frame upon the insertion of the cassette cartridge through the opening into the holding frame. When the retention lever is disengaged from the holding frame, a spring, engageable with the holding frame, moves the frame from a first position to a second or playing position. A projection having a roller rotatably mounted thereto is mounted to the holding frame and engageable with a control lever movable between an outward position wherein the control lever engages the roller to position and to hold the holding frame and the cartridge therein in the second or playing position and an inward position wherein the control plate engages an L-shaped lever pivotally mounted in the housing. Upon engagement of the control lever with one end of the L-shaped lever, the pivotal movement of the lever causes the end opposite thereto to engage the projection and move the holding frame from the second or play position to the first position wherein the cassette tape cartridge is in position for removal from the cassette tape device.

DETAILED DESCRIPTION

Figure 1:
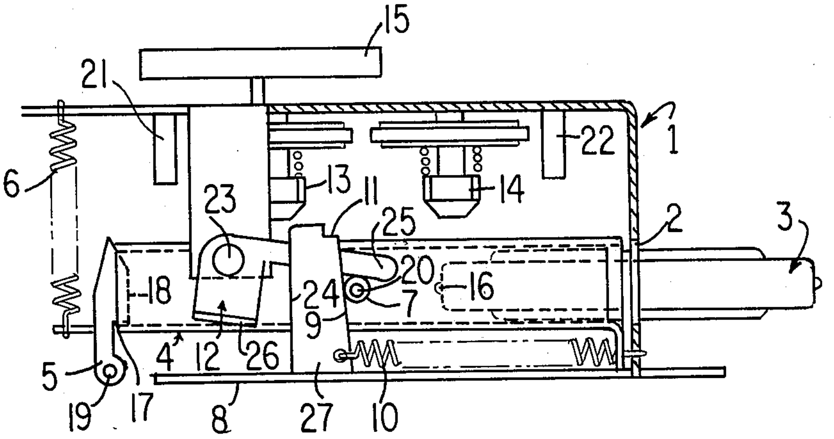
FIG. 1 is a side view of the cassette loading mechanism according to the present invention showing the insertion of the cassette tape cartridge into the cassette tape recorder/reproducer device.

Referring now to the drawings wherein like reference numerals have been used to disignate similar parts throughout the various views, in FIG. 1 numeral 1 designates the main body or housing of the cassette tape recorder/reproducer device. A cassette insertion slot or opening 2 is provided in the housing 1 for receipt of a cassette tape cartridge 3. A cassette accommodating case or holding frame 4 is mounted within the housing and aligned with the opening 2 to receive the cassette tape cartridge 3 when it is inserted into the opening 2 of the tape device. A retention or latching lever 5 is pivotally mounted within the housing 1 by pin 19 includes a latch portion 17 and is engageable with the cassette holding frame 4 to hold the holding frame 4 in alignment with opening 2. The latching lever 5 further includes a body portion 18 which is engaged by the cassette cartridge 3 when the cartridge is inserted through the opening 2 into the holding frame 4. When latching lever 5 is disengaged from frame 4, a spring 6, anchored to the housing 1, is engageable with the holding frame 4 to bias the holding frame upwardly away from alignment with the opening 2. Thus, the holding frame 4 is movable between a first position wherein the holding frame is in alignment with opening 2 and a second position wherein the holding frame 4 and the attendant tape cartridge 3 therein is held in the play position against the tape drive mechanism, which mechanism includes a takeup reel 13, a supply reel 14 and a flywheel 15.

The holding frame 4 includes a projection or pin 20 mounted thereto and extending outwardly therefrom within the housing 1. A roller 7 is rotatably mounted to the projection 20, which roller is engaged by a control lever or slide member 8 slidably mounted for forward and rearward movement within the housing 1. Control lever 8 includes a vertical lever portion 27 extending upwardly therefrom and having angled front surface 9 thereon, which surface is engageable with roller 7 when the control lever 8 is in its outward position. The vertical lever portion 27 further includes a recess or groove 11 at the end thereof. The control lever 8 is biased outwardly to its outward position by a spring which is connected to the vertical extension 27 and anchored to the housing 1.

Numeral 12 designates an L-shaped lever pivotally mounted by a fulcrum 23 to the housing 1. The lever 12 includes an end portion 25 and a flange portion 26 mounted on the end opposite the end portion 25. The lever 12 and the flange portion 26 are positioned within the housing such that the inward movement of the control lever 8 results in the inward surface 24 of the vertical lever portion 27 engaging the flange 26 to pivotally move the lever 12.

To understand the operation of the cassette loading mechanism of the instant invention, prior to the insertion of a cassette tape cartridge 3 into opening 2, the cassette loading mechanism and the cassette holding frame 4 are in the first position as shown in FIG. 1. Upon the insertion of a cassette tape cartridge 3 into the opening 2 of the housing 1, the end 16 of the cassette cartridge 3 engages the body portion 18 of the latching lever 5 to rotate the latching lever 5 in a counter-clockwise motion about pin 19. The latch portion 17 of latching lever 5 is thereby disengaged from the holding frame 4 with the result that the holding frame 4 is pulled upwardly by the force of spring 6.

Figure 2:
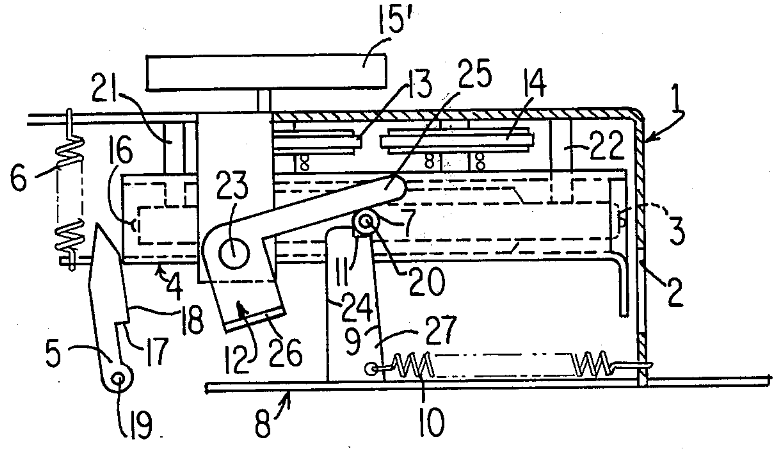
FIG. 2 is a side view of the cassette loading mechanism according to the present invention showing the positioning of the cassette tape cartridge in the play position.

Simultaneously with the movement of the holding frame 4 upwardly by spring 6, the roller 7, because vertical lever portion 27 is biased outwardly by spring 10, moves upwardly along angled surface 9 until roller 7 engages and rests in recess 11. The upward camming of force resulting between surface 9 and roller 7, coupled with the force in the upward direction because of spring 6 on the holding frame 4, thereby results in roller 7 automatically moving upwardly to engage and rest in recess 11. In such a position, the cassette tape cartridge 3 is engaged with pins 21 and 22 which project downwardly from the main body 1 to securely position and hold the cassette cartridge 3 and the cassette holding frame 4 in a firmly fixed playing position with respect to the tape drive mechanism, as shown in FIG. 2.

When it is desired to release the cassette from its playing position, the control lever 8 is initially pressed inwardly and the roller 7 is disengaged from the recess 11 in vertical lever portion 27. In such a position, only the force of spring 6 supports the cassette holding frame 4 and the cassette tape cartridge 3 in the playing position against the tape drive mechanism. As the control lever 8 is further pressed inwardly, the inward surface 24 on the vertical lever portion 27 engages flange portion 26 of the L-shaped lever 12 thereby rotating the lever 12 in a clockwise motion. Such clockwise movement of the release lever 12 causes the end 25 to move downwardly thereby engaging the projection 20 and causing roller 7 to move downwardly against surface 9 of vertical lever portion 27. When end portion 25 of lever 12 has pushed downwardly on projection 20 to a position wherein the holding frame 4 is aligned with the opening 2 in housing 1, the latching lever 5 and attendant latching portion 17 engages the holding frame 4 to hold the frame in the position as shown in FIG. 1. As the latch portion 17 engages holding frame 4, the inward movement thereof results in body portion 18 contacting end 16 of the cartridge 3 thereby causing the cartridge to move outwardly toward the opening 2. Although it is not shown or described in FIGS. 1 and 2, an ejection mechanism can be coupled to latching lever 5 to cause the cassette cartridge 3 to be ejected from the opening 2, as is well known in the art.

What has been described, therefore, is a cassette loading mechanism for use in a cassette tape recorder/-reproducer device which uses a minimum number of parts but which is capable of automatic operation position and to hold the cassette tape cartridge in playing position.

I claim:

1. A cassette loading mechanism for use in a cassette tape recorder/reproducer device including a housing having an opening adapted to receive a cassette tape cartridge and having a tape drive mechanism engageable with the tape cartridge to drive the same, including in combination:

a holding frame within the housing adapted to receive the cassette cartridge, said holding frame being movable between a first position aligned with the opening when the cassette cartridge is inserted into the recorder/reproducer device and a second position wherein the cassette cartridge is held in a play position against the tape drive mechanism, retention means engageable with said holding frame to hold the same at said first position, said retention means being disengageable from said holding frame upon the insertion of the cassette cartridge into said holding frame, biasing means engageable with said holding frame to move said holding frame from said first position to said second position upon disengagement of said retention means from said holding frame, projection means mounted to said holding frame, lever means pivotally mounted in the housing and engageable with said projection means, and control means movable between an outward position wherein said control means engages said projection means to position and hold said holding frame in said second position and an inward position wherein said control means engages said lever means to pivot the same, said pivotal movement causing said lever means to engage said projection means and move said holding frame to said first position wherein the cassette cartridge is held in position for removal through the opening in the housing and said retention means is engageable with said holding frame to hold the same at said first position.

2. The cassette loading mechanism in accordance with claim 1 wherein said projection means further includes a roller rotatably mounted thereon, said roller being engaged by said control means to hold said holding frame in said second position.

3. The cassette loading mechanism in accordance with claim 1 wherein said control means includes a slide member having a vertical lever portion mounted thereon, said vertical lever portion being engageable with said projection means to position and to hold said holding frame in said second position.

4. The cassette loading mechanism in accordance with claim 3 wherein said vertical lever portion further includes a recess on the end thereof adapted to receive said projection means, said projection means being positioned in said recess when said holding frame is in said second position.

5. The cassette loading mechanism in accordance with claim 3 wherein said vertical lever portion further includes an angled surface portion engageable with said projection means to provide a camming action between said surface and said projection to move said holding frame to said second position.

6. The cassette loading mechanism in accordance with claim 1 wherein said lever means includes an L-shaped lever pivotally mounted in said housing, said lever further including one end portion engageable with said projection means and an end opposite said one end portion having a flanged portion extending perpendicularly thereto, said flange portion being engageable with said control means when said control means is in said inward position, said engagement of said control means with said flange portion causing said L-shaped lever to pivot whereby said one end portion engages said projection means to move said holding frame to said first position.

7. The cassette loading mechanism in accordance with claim 1 wherein said biasing means is a spring.

8. The cassette loading mechanism in accordance with claim 1 wherein said control means further includes spring means engageable with said control means to bias said control means from said inward position to said outward position when said holding frame is in said first position.

* * * * *